United States Patent [19]

Makino et al.

[11] Patent Number: 4,695,893

[45] Date of Patent: Sep. 22, 1987

[54] AUTOMATIC FOCUSING APPARATUS

[75] Inventors: Hiroshi Makino, Hirakata; Tsunemi Yoshino, Nara; Tadaharu Kihara, Habikino; Akira Takashima, Osaka, all of Japan

[73] Assignee: West Electric Company, Ltd., Osaka, Japan

[21] Appl. No.: 786,959

[22] PCT Filed: Feb. 20, 1985

[86] PCT No.: PCT/JP85/00072

§ 371 Date: Oct. 4, 1985

§ 102(e) Date: Oct. 4, 1985

[30] Foreign Application Priority Data

Feb. 21, 1984 [JP] Japan .................................. 59-30858
Feb. 24, 1984 [JP] Japan .................................. 59-34655

[51] Int. Cl.$^4$ ........................ H04N 5/232; G03B 3/00
[52] U.S. Cl. ..................................... 358/227; 354/403
[58] Field of Search ........................ 358/227; 354/403

[56] References Cited

U.S. PATENT DOCUMENTS

| | | | |
|---|---|---|---|
| 4,550,995 | 11/1985 | Toyama et al. | 354/403 |
| 4,581,653 | 4/1986 | Kaneda | 358/227 |
| 4,591,919 | 5/1986 | Kaneda et al. | 354/403 |
| 4,592,638 | 6/1986 | Kaneda et al. | 354/403 |

*Primary Examiner*—Russell E. Adams
*Attorney, Agent, or Firm*—Cushman, Darby & Cushman

[57] ABSTRACT

In an automatic focusing apparatus which detects sharpness signals from high-frequency components of brightness signals contained in video signals from video cameras and which stops a focusing lens of the video camera at a position at which its peak value is obtained, the movement of the focusing lens is started by detecting received light signal levels by performing projection-reception operations with a specified amount of infrared light and detecting their variations with a received light signal level detector or with a micro-computer. Furthermore, depending upon the focal depth of the focusing lens, priority is given to processing of distance information based on sharpness signals or distance information determined by the infrared light projection-reception operation in the lens driving controller for performing the focusing operation. According to the automatic focusing apparatus of the present invention, movement of the lens only due to variations of contrasts can be avoided, and stable image pictures are thus obtainable. Also, the most suitable focusing operation mode for a particular focal depth of a lens in use can be selected.

15 Claims, 8 Drawing Figures

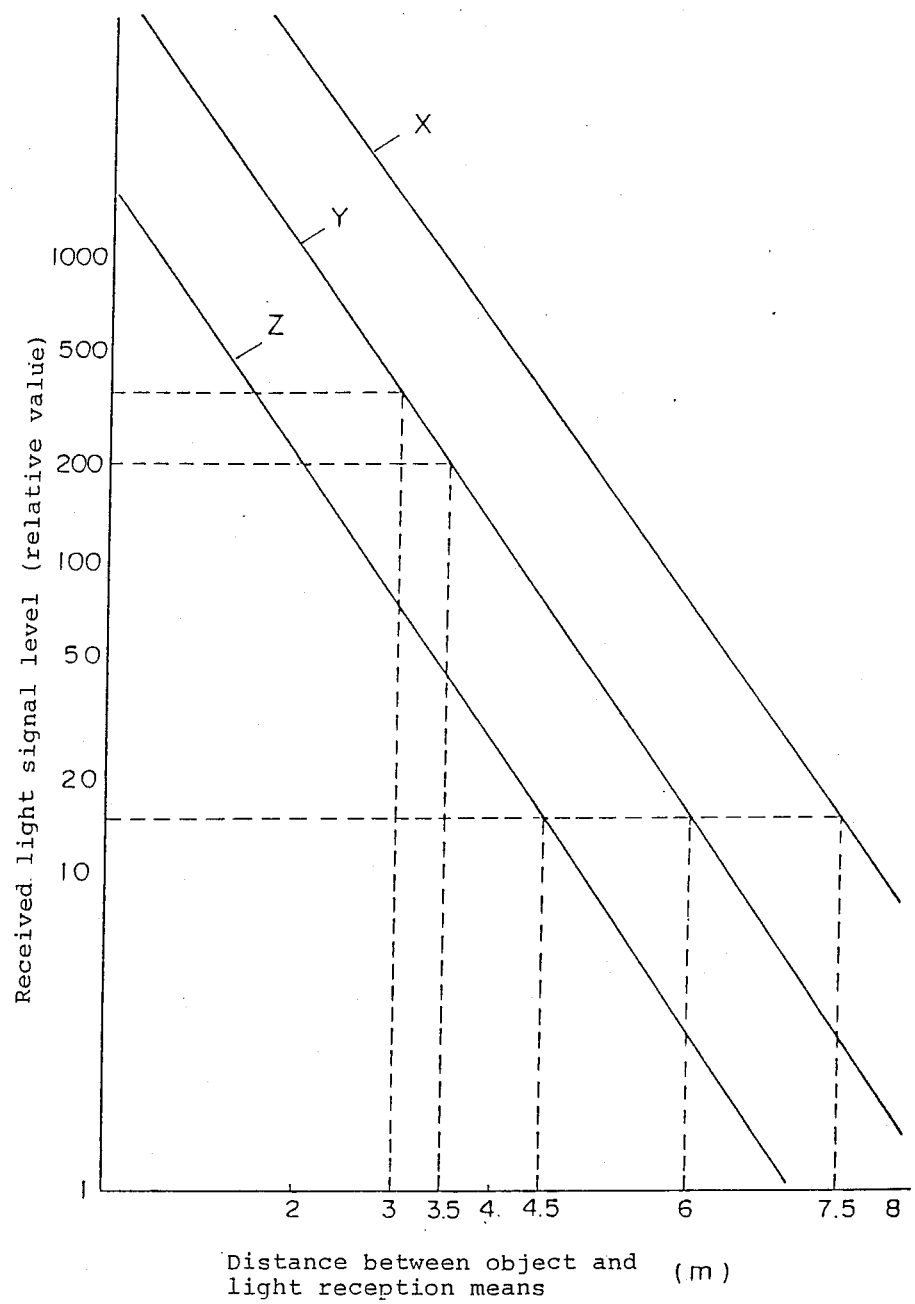

AUTOMATIC FOCUSING APPARATUS

TECHNICAL FIELD

The present invention relates to an automatic focusing apparatus suitable for video cameras and television cameras with a zoom lens in which an accurate focused state for those objects from a very close distance up to more than 10 m is desired.

BACKGROUND ART

In prior art automatic focusing apparatuses for video cameras, appropriate sharpness signals are detected from the high frequency components of brightness signals which are contained in the video signals, and movement of a focusing lens is controlled so that those brightness signals become a maximum. In others, the distance to an object is measured by performing projection-reception operations of infrared light or transmission-receiving operations of supersonic signals to the object, and on the basis of those measured results the movement of a focusing lens is controlled.

The former approach to obtain the focused state by detecting the sharpness signal is based on a principle widely known from disclosures such as NHK Research Laboratory Report, Showa 40, Vol. 17, No. 1, pages 21 to 37. As discussed therein, as the lens approaches a focused state, high frequency components in the video signals increase and peak at the focused state. This approach has advantages in comparison with other approaches such as, for example, the supersonic focusing method or the light projection-reception method. Namely, in those apparatuses, sensors are necessary as a distance measuring means. Sensors such as a supersonic transmitter/receiver element or a projection-reception element are used, and since ordinarily a tele-zoom lens is attached to video cameras or other cameras for use as the above-mentioned sensors, it is required that they are highly accurate even for distances greater than several meters. Thus, the cost becomes very expensive, and an accurate distance measurement for greater than 10 m, for example, becomes difficult. By contrast, measuring the focused state using the sharpness signal does not require any sensor as a particular distance measurement means, thereby making it possible to obtain an automatic focusing apparatus which is low-cost, small-sized, and capable of discriminating the focused state regardless of distance. However, such a device has difficulties of two kinds, as will be described below.

In the system in which appropriate sharpness signals corresponding to the sharpness of picture images are detected from high frequency components of the video signal and the movement of a focus adjustment lens is controlled, when an object moves from an arbitrary focused state to another focused state, the variations of the above-mentioned sharpness signals are used to control the movement of the lens. Namely, since the sharpness signals are at a peak when in a focused state, when the sharpness signal in an arbitrary focused state changes, it is judged that the lens goes from a focused position to an out of focused position, and the movement of the lens is started. However, it is known that the high-frequency components in the video signals vary when the contrast of the object, i.e., the brightness distribution state varies Therefore, for example, when in a state wherein an arbitrary focused state is obtained, such as when an object moves simply left or right without changing the distance to the automatic focusing apparatus, it is considered that the contrast of the object is easily changed.

In the case that the contrast of the object varies as described above, notwithstanding that the distance to the object does not change, the movement of the focusing lens is started. Thus, even though contrast variation takes place, the lens position at which the peak of the sharpness signals is obtained does not change its distance and remains at the same position as before the movement. The lens returns to the original position instantly and stops there, hence it is needless to describe in detail that the moving distance and the moving time are very small amounts. However, even though the moving distance and the moving time of the lens are slight, the fact that the moving action of the lens is carried out every time the contrast varies, notwithstanding that the position of the lens is at a focused position, makes the picture image very unsightly. Thus, the fact that the above-mentioned action takes place was a great problem in the prior art which could not be overlooked.

Although there have been examples of automatic focusing apparatuses employing schemes detecting the sharpness of the video signals in the prior art which were put into practical use, the problem described above was avoided by making the moving speed of the lens a high speed so as to essentially solve the phenomenon that the picture image became unsightly. However, for the purpose of utilizing the feature in the above-mentioned method efficiently, it is strongly desired to solve the above-mentioned problem without merely increasing the moving speed of the lens.

The automatic focusing apparatus utilizing the sharpness signal also has a second difficulty, other than the first difficulty described above, which is caused by the variation characteristic of high-frequency components of video signals influenced by the focal depth of the focusing lens rather than by the above-mentioned distance and contrast. For the sharpness signals obtained by adequate processes of the high-frequency components of video signals, it is known that the characteristics for objects at various distances are such as those shown in FIG. 1 when the aperture value of the lens is kept constant and the focused position is taken to be 3 m. In other words, it is known that when the iris number is kept constant, the shorter the focal length is, the deeper the focal depth becomes. Thus, when such a lens has a short focal length, even if the lens is brought out of the focused position by the focusing operation, variation of the sharpness signal is very small.

A conventional automatic focusing apparatus detects the variation in the sharpness signal due to the distance to an object, and movement of the lens is started first, thereafter confirming its moving direction in accordance with the variation characteristic of the sharpness signal associated with this lens movement. In other words, if the sharpness signal is making its variation in the direction toward a peak point, and if it is in the right direction, the above-mentioned movement of the lens continues until a peak point of the sharpness signal is detected. Consequently, if the object presently under shooting is changed from one at a remote distance to one at a distance of 3 m, for example, and this object at the position of 3 m is making a movement producing variations in its contrast without changing its distance, characteristics of the sharpness signals in two lenses with different focal lengths, for example, in lenses of focal lengths of 80 mm and of 20 mm, are as shown in FIGS. 2(A) and (B), respectively. The broken lines in FIGS. 2(A) and (B) show the characteristics of the sharpness signals when an object does not make a movement resulting in contrast variations.

Time point $t_1$ in FIG. 2 represents a time point at which the above-mentioned switch-over of the object occurs. In other words, the time interval from $t_0$ to $t_1$ corresponds to the sharpness signals in a state with a peak value $A_1$ occurring when the object is focused at a remote distance, and the fall of the sharpness signal at the time point $t_1$ corresponds to a variation produced by the transition of the lens state from a focused state to an out of focus state caused by movement of the object.

In general, it is known that when the characteristics of the variations of the sharpness signals with respect to variations of the contrast of an object approaches a peak value which might be obtained at a focused state, the amount of variation becomes large, even if the contrast variations are kept constant. However, when a long focal-length lens is used, whose focal depth is shallow, it is clear from FIG. 1 that the variation of the amplitudes of the sharpness signal with respect to variations of distance to an object is large. Accordingly, even when variations in contrast occur without accompanying variations of distance to the object, the variation amplitude becomes smaller than the amplitude caused by the variations in the focused state. Consequently, in the case of a long focal-length lens whose focal depth is shallow, as is shown in FIG. 2(A), although affected by contrast variation, the lens is moved to a state at which a peak value $A_2$ for objects at a close distance is obtained. If a fall of a width of D as shown in FIG. 2(A) is obtained, the peak $P_1$ is judged to be the focused state, and the control is performed based on this peak $P_1$. Thus, control stops at a state where $P_1$ is obtained again. The setting of the above-mentioned width D should be done properly so as not to follow the contrast variations having no distance movement.

When a short focal length lens whose focal depth is deep is used, as is clear from the characteristic shown in FIG. 1, even if a distance variation at the time point $t_1$ is large, variation of the sharpness signal is not so large, and only those sharpness signals whose values are close to a peak value at the focused state are obtained. Therefore, when contrast variation takes place, it is conceivable that its variation amplitude, even if its absolute value is small, becomes larger than the variation amplitudes caused by variations in the focused state. Consequently, when a short focal-length lens is used wherein its focal depth is deep, many peaks appear which are caused by either the contrast variations or coming into the focused state. The control is performed as if it were at the focused state at every peak; therefore, it becomes difficult to judge which peak corresponds to a position of an accurate focused state. As a result of this, there has been a problem that stopping the lens at the focused state under any condition became very difficult, and depending on the situation, the lens eventually kept moving.

As is evident from the characteristic of a lens of a deep focal depth, the variation amplitude of the sharpness signal with respect to the distance variations is small, and even if the distance to the object or the lens position varies to some extent, picture images which are almost in the same state as the focused state are obtained. Thus, when the distance to the object varies as described above, it becomes very difficult to detect from the sharpness signals an accurate focused state. Therefore, in a conventional automatic focusing apparatus utilizing the sharpness signal, the deeper the focal depth is, the more difficult the detection of the focused state becomes.

In the prior art, it is also known that when the focal length is constant, as the aperture value becomes larger (i.e., the aperture area becomes smaller), the focal depth of a lens becomes deeper; therefore, when the aperture value is large, as in the above case, there is a fear that an accurate detection of the focused state is not possible.

The other prior art systems wherein the distance information to the object is gained by the projection-rejection operation of infrared light or the transmission and receiving operation of a supersonic signal its now considered. First, when the projection-reception operation of infrared light is employed, if it is desired to get accurate distance information even for objects at a distance of around 10 meters, the distance detection operation is based upon a means of triangulation. Thus, a high precision light reception element is required, and at the same time, the apparatus relating to the position setting of a light projection and reception part requires a high precision structure, thereby introducing a large difficulty of rise in cost. When the transmission and receiving operation of a supersonic signal is employed, on the other hand, although the cost becomes low, the longer the distance to be measured, and the more accurate the distance information desired, the larger the supersonic transmitter/receiver must be. Thus, the apparatus becomes large, and since it is limited in how large it can be, there has been a problem in that the precision of the distance information is worse in comparison with the above-mentioned light projection-reception operation. Accordingly, a compact automatic focusing apparatus which can be installed with an ordinary zoom lens for use in video cameras and other cameras capable of obtaining the focused state with high precision even for objects at a distance of around 10 m is strongly desired.

OBJECT AND SUMMARY OF THE INVENTION

The object of the present invention is to offer an automatic focusing apparatus in which the sharpness signal and a light reception signal level, that is, an output signal detected by the infrared light projection and reception operation, are used effectively.

Another object of the present invention is to offer an automatic focusing apparatus wherein the movement of a focusing lens is started by detecting the variations of the received light signal levels obtained by the infrared light projection-reception operation, and the movement is terminated by detecting peak values of the sharpness signals obtained from the high-frequency components of the video signals.

Still another object of the present invention is to offer an automatic focusing apparatus wherein a first distance information signal, which is the sharpness signal obtained from the video signal, a second distance information signal formed from the received light signal level obtained by the infrared light projection-reception operation, and a focal depth information signal, which varies in response to the focal depth of the lens, are used such that the variation of the distance to the object is detected by the second distance information signal linked to the variation of the above-mentioned received light signal level. At the same time, by selecting the distance information used for the focused state judgment in responding to the focal depth information from the above mentioned first and second distance information signals, the movement of the focus adjustment lens to the focused state is controlled at a plurality of different operating states in response to the focal depth of the lens.

The present invention is an automatic focusing apparatus wherein the sharpness signal is obtained from the high-frequency components of the brightness signal included in the video signal, and at a time point when a maximum value is obtained, the drive of the focusing lens by a lens driving means is terminated. The lens movement is started by measuring the variations in the received light signal levels as a result of projecting a specified amount of infrared light onto an object and receiving a reflected light from this object Thus, the focusing, lens movement is started when variations of the received light signal levels are detected. Also, in response to the focal depth of the focus lens, the distance information used for the focused state judgment is selected from the distance information based on the sharpness signal and the distance information obtained from the received light signal level in the infrared light projection-reception operation so as to control the movement of the focusing lens to the focusing state depending upon the focal depth of the lens being used.

BRIEF DESCRIPTION OF DRAWINGS

FIG. 8 is a set of characteristic curves of received light signal levels for different objects in the infrared projection-reception operation with a specified amount of light.

PREFERRED EMBODIMENT OF THE PRESENT INVENTION

The present invention relates to an automatic focusing apparatus wherein the focused state of a focusing lens detected by obtaining an adequate sharpness signal from the video signals and the received light signal level detected by the projection-reception operation of infrared light are combined, as described below.

Figure 3:
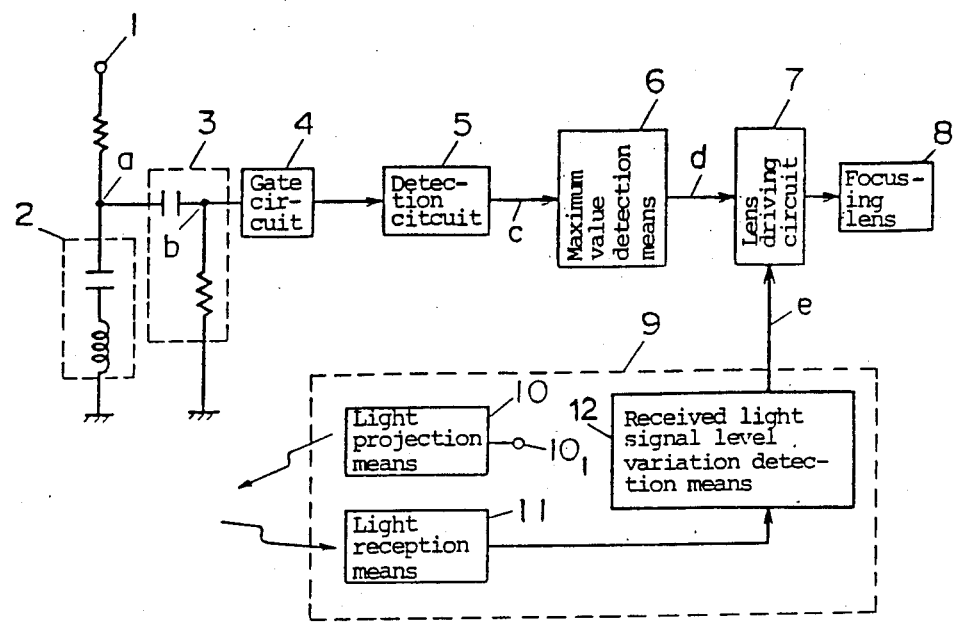
FIG. 3 is a block diagram showing an embodiment of the automatic focusing apparatus in accordance with the present invention.

FIG. 3 is a block diagram showing an embodiment of an automatic focusing apparatus in accordance with the present invention. In this figure, 1 is a video signal input terminal through which the video signal from a video camera (not shown) is supplied; 2 is a color signal elimination circuit consisting of a capacitor and an inductor which eliminates the color signal from the video signal supplied from the above-mentioned video signal input terminal 1 and outputs the brightness signal to a point a; and 3 is a differentiation circuit composed of a capacitor and a resistor for taking out high-frequency components from the brightness signal at the point a and providing an output to a point b. Numeral 4 designates a gate circuit for detecting only those signals within a specified region in the image picture frame, and numeral 5 designates a detection circuit for outputting adequate sharpness signals at a point c. The above-mentioned color signal elimination circuit 2, the differentiation circuit 3, the gate circuit 4, and the detection circuit 5 are recognized as a sharpness signal generation means.

Numeral 6 designates a detection means of maximum values in the sharpness signals which are fed through the detection circuit 5, and it works in such a manner that at a detection of a maximum value it outputs at d lens movement termination signals which are supplied to a lens driving circuit 7 for controlling the movement of a focusing lens 8. Numeral 9 denotes a distance variation detection means for detecting whether the distance to the object varies or not, and it comprises a light projection means 10 for projecting a specified amount of infrared light to the object, a light reception means 11 for detecting the reflected light from the object, and a received light signal level variation detection means 12 for generating lens movement start signals which are supplied to the lens driving circuit 7 at a point e in response to the received light signal level of the reflected light obtained from the light reception means 11. The light projection operation of light projection means 10 is started by a start signal of a specified duration which is applied to a start terminal $10_1$.

Next, prior to giving an explanation of the operation of this embodiment, a description of the light projection-reception operation of the projection means 10 and the light reception means 11 which forms a part of the distance variation detection means 9 is given.

Figure 4:
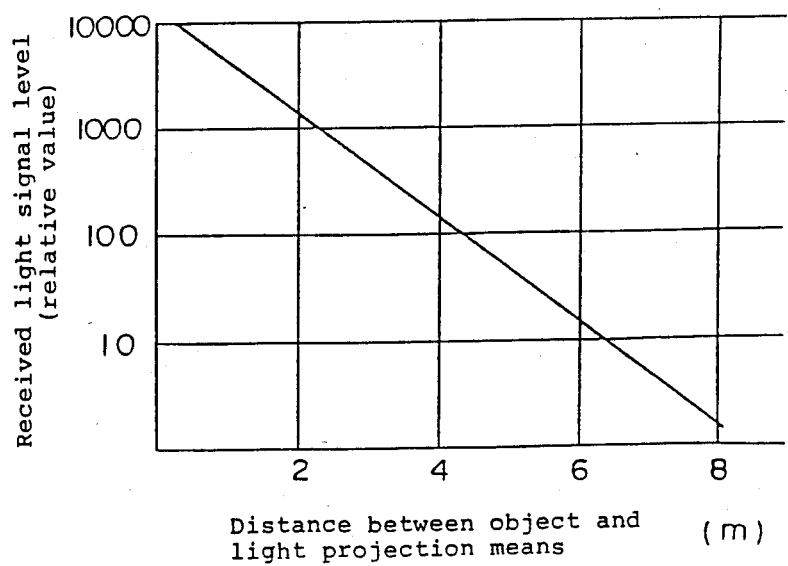
FIG. 4 is a received light signal level characteristic curve of the infrared light projection-reception operation.

FIG. 4 shows a typical example of the characteristics of the received light signal level of the light reception means 11 when an object being focused is a person. As is evident from this graph, the characteristic of the received light signal level in the infrared projection-reception operation for an object positioned at 3 m shows that the received light signal level is about 500, and if it goes down to 3.5 m, in spite of a variation in distance of only 0.5 m, the received light signal level becomes about 250. Thus, about a half of the received light as in the above-mentioned case of 3 m is received at 3.5 m, for the received light level varies exponentially with respect to the distance. Furthermore, even if the object moves laterally without changing its distance, but thereby changes its contrast, since the object is the same one the reflectivity of the infrared light changes little; therefore, the received light signal level of the light reception means 11 varies little. Thus, in comparison with the variation characteristic of the sharpness signal caused by the change in contrast, the variation characteristic of the received light level of the above-mentioned light reception means 11 can be regarded as a characteristic which varies only when the distance to the object changes.

Figure 1:
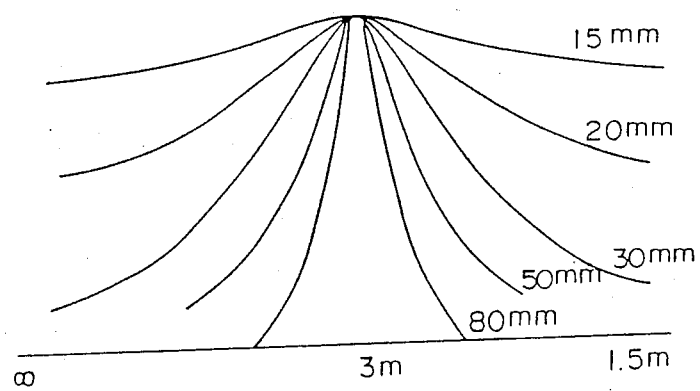
FIG. 1 shows a set of characteristic curves representing the sharpness and the focal length to an object at 3 m when the aperture values are kept constant.

Now the operation of the embodiment shown in FIG. 1 will be described.

When the focusing lens 8 is brought into a focused state for an arbitrary object and stops there, if the object makes such a movement that its distance to the apparatus is changed, by projecting a specified amount of infrared light onto the object by the light projection means 10 during an arbitrary time interval, the received light signal level of the light reception means 11 receiving a reflected light from this object represents the distance changes with an extremely high sensitivity which varies as described before. This variation in the received light signal level is detected by the received light signal level variation detection means 12, and a lens movement start signal is outputted to a point e and supplied to the lens driving circuit 7. The lens driving circuit 7 makes the focusing lens 8 start to move in response to this lens movement start signal.

A video signal supplied through the input terminal 1 varies its focused state from time to time because of the movement of the lens 8. As described above, the video signal is first supplied to the color signal elimination circuit 2, thereby eliminating the color signal, and then it is outputted to the point a as the brightness signal. The brightness signal at the point a is differentiated by the differentiation circuit 3 such that only its high-frequency components are detected at the point b. Those high-frequency components detected at the point b are selected by the gate circuit 4 such that only those components within a specified region, for example, in the central part of the picture frame, are supplied to the detection circuit 5. The detection circuit 5 produces adequate sharpness signals corresponding to the sharpness of the video signals from those high-frequency components within the specified region of the picture frame which are supplied through the gate circuit 4, and these signals are outputted to the point c. The sharpness signal outputted by the detection circuit 5 can be obtained by, for example, holding the peak value of the high-frequency components in one horizontal scanning period or by integrating this peak value over one vertical scanning period. They may also be obtained by taking the average value of the above-mentioned peak value over one vertical scanning period.

Since the lens 8 moves and the video signal is varying, the state of the above-mentioned sharpness signal also varies, thus its maximum value (peak value) is detected by the maximum value detection means 6. When the maximum value is detected by the maximum value detection means 6 during the movement of the lens 8, this detection means 6 outputs a lens movement termination signal to the lens driving circuit 7 to stop the movement of the lens 8. Thus, by the action described above, the focusing lens 8 is moved in response only to objects actually moving.

The light projected by the light projection means 10 is set to be capable of performing its action continuously during an appropriate time interval during the operation of the apparatus such that even when a human object keeps walking and the distance to the apparatus is changed continuously, variations of the focused state by the movement of the lens 8 can follow sufficiently. In addition, at the start of the use of the apparatus, for example, when the power switch of the apparatus is turned on, the lens 8 is moved forcibly for a specified period until the termination action caused by the sharpness signal and the lens movement starts to work, thereby making it possible to achieve the above-mentioned operation without any difficulty.

Figure 5:
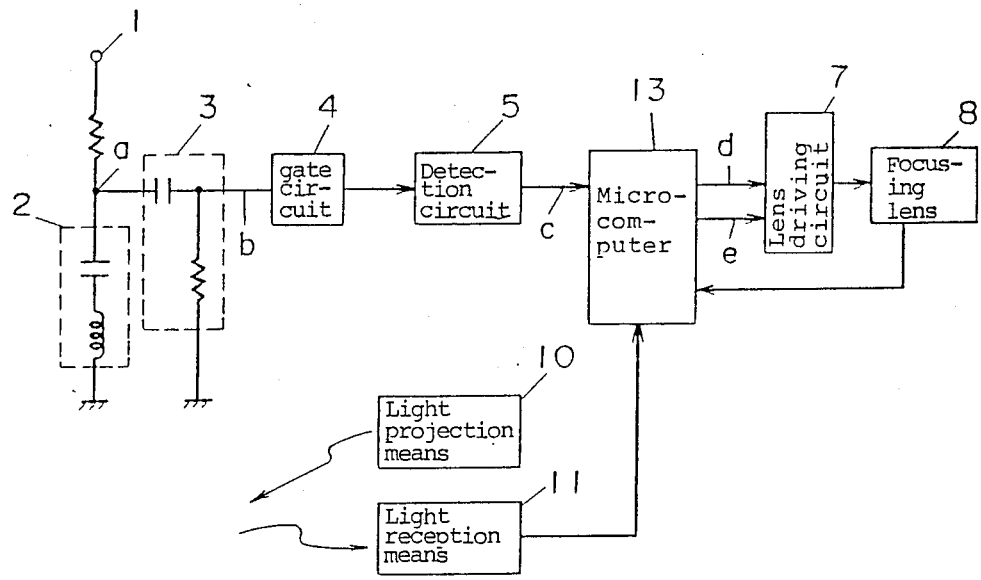
FIG. 5 is a block diagram showing another embodiment of the automatic focusing apparatus in accordance with the present invention.

FIG. 5 is a block diagram showing another embodiment of an automatic focusing apparatus in accordance with the present invention. As is clear from this drawing, this embodiment shows an example of the FIG. 3 apparatus in which the maximum value detection means 6 and the received light signal level detection means 12 are replaced by a micro-computer 13. Micro-computer 13 may also perform other functions, and its function is not limited to that of the above two means. Since the embodiment shown in FIG. 5 has the same configuration with that of the embodiment shown in FIG. 3 except for the micro-computer 13, only the operation of the micro-computer 13 will be additionally described.

Figure 6:
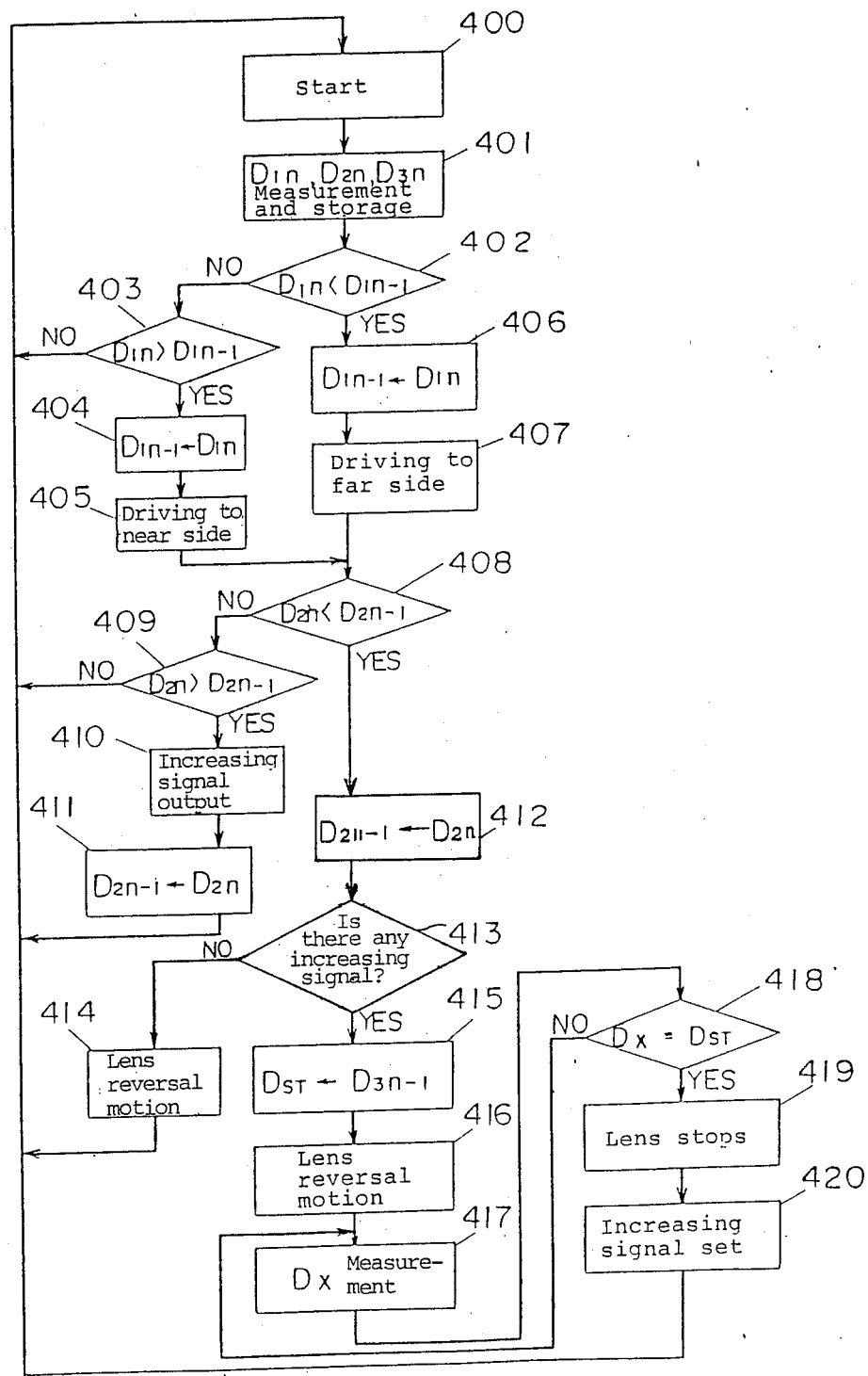
FIG. 6 is a basic operation flow chart of a micro-computer 13 in the embodiment shown in FIG. 5.

The micro-computer 13 operates in accordance with the flow chart of FIG. 6. In the flow chart of FIG. 6, $D_{1n}$, $D_{2n}$, $D_{3n}$ and $D_{1n-1}$, $D_{2n-1}$, $D_{3n-1}$ designate the received light signal levels of the light reception means, the sharpness signals, and the position signals of the lens 8, respectively.

First, at step 400 the system is initiated. The initiation step sets a judgment timing of whether the sharpness signal supplied through the detection circuit 5 is a maximum value or not such that during operation clock pulses are issued at every picture frame. Next, at step 401, the output signal level $D_{1n}$ of the light reception means, the sharpness signal $D_{2n}$, and the lens position signal $D_{3n}$ are respectively measured and stored. When measurements of the respective signals are completed, step 402 is selected, and the received light signal level $D_{1n}$ measured at the present time is compared with the level $D_{1n-1}$ measured at a previous time. From the result of the comparison at step 402, when the above-mentioned $D_{1n}$ is not smaller than $D_{1n-1}$ a step 403 is selected, and when $D_{1n}$ is smaller than $D_{1n-1}$ a step 406 is selected, respectively. The step 403 judges whether the measured value $D_{1n}$ of the present time is larger than the measured value $D_{1n-1}$ of the preceding time. When $D_{1n}$ is judged not to be larger than $D_{1n-1}$, when considered together with the result at step 402, it is apparent that $D_{1n}=D_{1n-1}$, and the flow returns back to step 400. The result that $D_{1n}=D_{1n-1}$ occurs when the object is at the same position and at the same distance as at the preceding time; therefore, the various actions such as lens movement, which is described later, are not necessary. Control then returns to the initial state.

Figure 2:
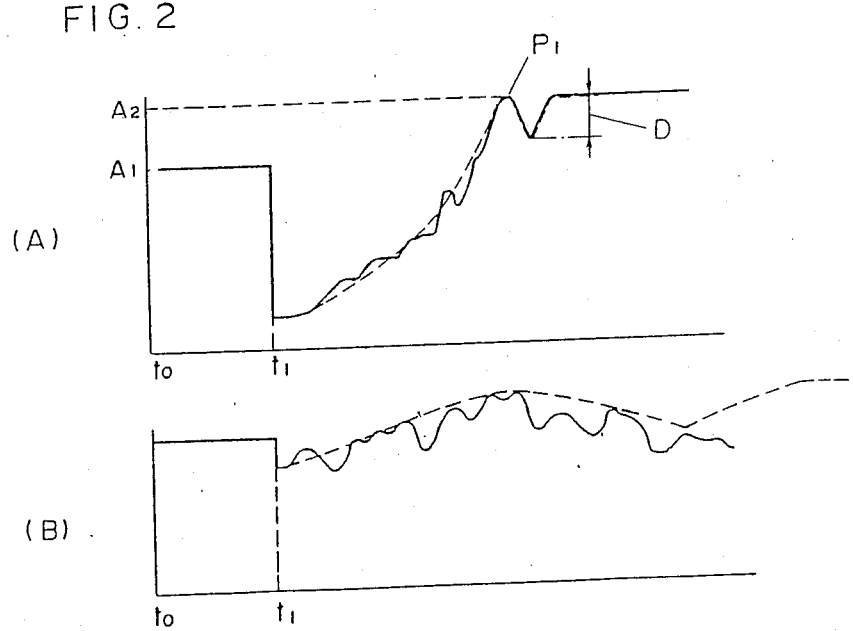
FIG. 2 shows the sharpness characteristic curves of lenses having different focal lengths with the aperture value constant.

In the comparison at step 403, if $D_{1n}$ is judged to be larger than $D_{1n-1}$, step 404 is selected, and $D_{1n}$ is shifted to $D_{1n-1}$. If this shift is completed, at step 405 a first lens movement start signal is outputted, and the lens is moved in a first direction. The first direction is thus chosen in step 405 when $D_{1n}$ is larger than $D_{1n-1}$. Therefore, the lens is moved in the first direction when the distance to the object becomes less, as is evident from the received light signal level characteristic shown in FIG. 2. The lens is thus adjusted so as to focus an object at a closer distance, that is, the lens is focused on the closer object by driving the lens to the "near side" as shown in step 405. If in step 405 the movement of the lens is started, step 408 is then selected.

In step 402, if the measured value $D_{1n}$ of the present time is judged to be smaller than $D_{1n-1}$ of a preceding time, step 406 is selected, and as in step 404, $D_{1n}$ is shifted to $D_{1n-1}$. When the shift in step 406 is completed, step 407 is selected, and a second lens movement start signal is outputted. The lens is then moved in a second direction. Thus, the second direction in step 407 is selected when $D_{1n}$ is smaller than $D_{1n-1}$, which is opposite to the direction of movement in step 405, and the lens is moved in a direction so as to focus on a further object by driving the lens to the "far side" as shown in step 407. If the movement of the lens is started at step 407, as at step 405, step 408 is then selected.

At step 408 the sharpness signal $D_{2n}$ from the present measurement is compared with the sharpness signal $D_{2n-1}$ from the preceding measurement, and when $D_{2n}$ is not smaller than $D_{2n-1}$, step 409 is selected. Similarly, when $D_{2n}$ is smaller than $D_{2n-1}$, step 410 is selected. At step 409, $D_{2n}$ and $D_{2n-1}$ are compared, and when $D_{2n-1}$ is larger than $D_{2n}$ step 410 is selected. When $D_{2n-1}$ is not larger than $D_{2n}$, considering the result of the comparison at step 408, it is determined that $D_{2n} = D_{2n-1'}$ and since in such a case the sharpness signal cannot be distinguished by the comparison of the values at the present and the preceding times, flow returns back to step 400.

Step 410 is selected when $D_{2n}$ is larger than $D_{2n-1}$; therefore, the sharpness signal is varying about a peak point. In this case it is necessary to output an increment signal indicating the increment toward the peak point into a specified memory (not shown). After the signal indicating the increment of the sharpness signal is stored at step 410, step 411 is selected, and $D_{2n}$ is shifted to $D_{2n-1}$. Once step 411 is completed, since $D_{2n}$ is not smaller than $D_{2n-1}$ at step 408 (i.e., in a state in which the judgment of whether a peak point has been passed over cannot be made), the system returns to the initial step 400 to make a further movement of the lens.

If $D_{2n}$ is judged to be smaller than $D_{2n-1'}$ the sharpness signal indicates either that the sharpness signal has passed over a peak point or that it is successively descending down. Therefore, those operations after step 412 are carried out to determine which case is true. $D_{2n}$ is shifted to $D_{2n-1}$ at step 412 so as to replace signals of preceding times, which are to be used in later processes, with signals of the present time. When the shift at step 412 is completed, step 413 is selected, and step 413 judges whether the signal indicating the increment of the sharpness signal at step 410 has been outputted in the operation done so far. If no signal has been outputted indicating that the increment was present in a previous step, it is determined that the sharpness signal is descending down without any increment. This state obviously represents a state in which the lens is out of the focused state. Accordingly, since this indicates that the direction of movement of the lens determined at steps 405 or 407 was false, step 414 is selected, and the lens is moved in the reverse direction than that of the preceding decision. When the movement of the lens is started at step 414, the flow is returned back to step 400 so as to enable the distance variation detection action of the output by the light reception means.

At step 413, when it is judged that the signal indicating the increment of the sharpness signal by step 410 was present due to lens movement at steps 405 or 407, the sharpness signal is determined to be varying after passing through a peak point, so thereafter the flow is not transferred back to the operation system until after step 415, wherein the lens is moved to the peak point and stopped there.

At step 415 the signal $D_{3n-1}$ of one time before the present lens position signal $D_{3n}$ is stored as a stop position signal $D_{ST}$. In other words, considering the actions of steps 408, 409, and 413 in which $D_{3n-1}$ cannot be defined strictly, it is evident that $D_{3n-1}$ corresponds to a lens position in the neighborhood of the peak point. In this case, as is elucidated in the following steps, the signal $D_{3n-1}$ present at step 410 of the preceding time when step 413 judged that a peak point had been passed over is determined to be a focused position of the lens.

When the lens position $D_{ST}$ is set at step 415, control proceeds to step 416, and the lens movement is reversed. When the lens movement in the opposite direction is started at step 416, at step 417 the lens position signal $D_X$ during such operation period is detected. After $D_X$ is detected at step 417, at step 418 $D_X$ and $D_{ST}$, which was stored at step 415, are compared. If $D_X$ does not equal $D_{ST}$ at step 418, step 417 is selected once again, and detection of a new $D_X$ and a new comparison action by step 418 are performed. If the result of the comparison at step 418 is that $D_X$ and $D_{ST}$ are equal, the lens is determined to have arrived at a point where the lens is desired to be stopped. Thus, the lens movement is terminated at step 419, and it is determined that the lens has been moved efficiently to a focused point with respect to the moved object as determined by the output state and the sharpness signal of the distance variation detection means utilizing the infrared light projection-reception function. After step 419 is completed, step 420 is selected, and after the signal indicating that the increment of the sharpness signal outputted in step 410 has been reset, the flow returns back to the initial state 400. That is, the system is returned back to a state for responding to the next movement of the object.

Although the description has been made with reference to only one example of the microcomputer 13 in the embodiment of FIG. 5, other variations are possible. For example, by letting $D_{2n}$ and $D_{2n-1}$ used in the above-mentioned flow chart have arbitrary widths, the system may be devised so as not to follow an instantaneous contrast variation which has no relation to the distance.

As has been described above, in those embodiments shown in FIG. 3 and FIG. 4, the judgment in attaining the focused state of a focusing lens in a video camera is carried out by determining the peak point of the sharpness signal obtained from high-frequency components included in the video signals, and at the same time, the start of the movement of the lens associated with the distance variations caused by movements of the object is controlled by a distance variation detection means capable of detecting the received light signal level. Thus, these embodiments show an automatic focusing apparatus with a high practical utility wherein the lens does not move due to mere contrast variations, thereby causing deterioration in the video picture. Furthermore, those object distance variation detection means in either embodiment, for example, the distance variation detection means 9 in the embodiment of FIG. 3, are sufficient if the variations of the distance to the object can be detected. Thus, it is not necessary to detect the distance to the object, only the variations. Therefore, the apparatus can be simply realized, and its cost can be made very low.

In the distance variation detection means, by utilizing the fact that the received light signal level obtained by a specified amount of infrared light is a function of distance, if the accuracy is raised so as to form a distance signal, the inconveniences caused by the focal depth or the aperture noted above can be improved. Thus, the automatic focusing apparatus of the present invention complements the methods utilizing the sharpness signal and the light projection-reception operation in an effective manner.

Figure 7:
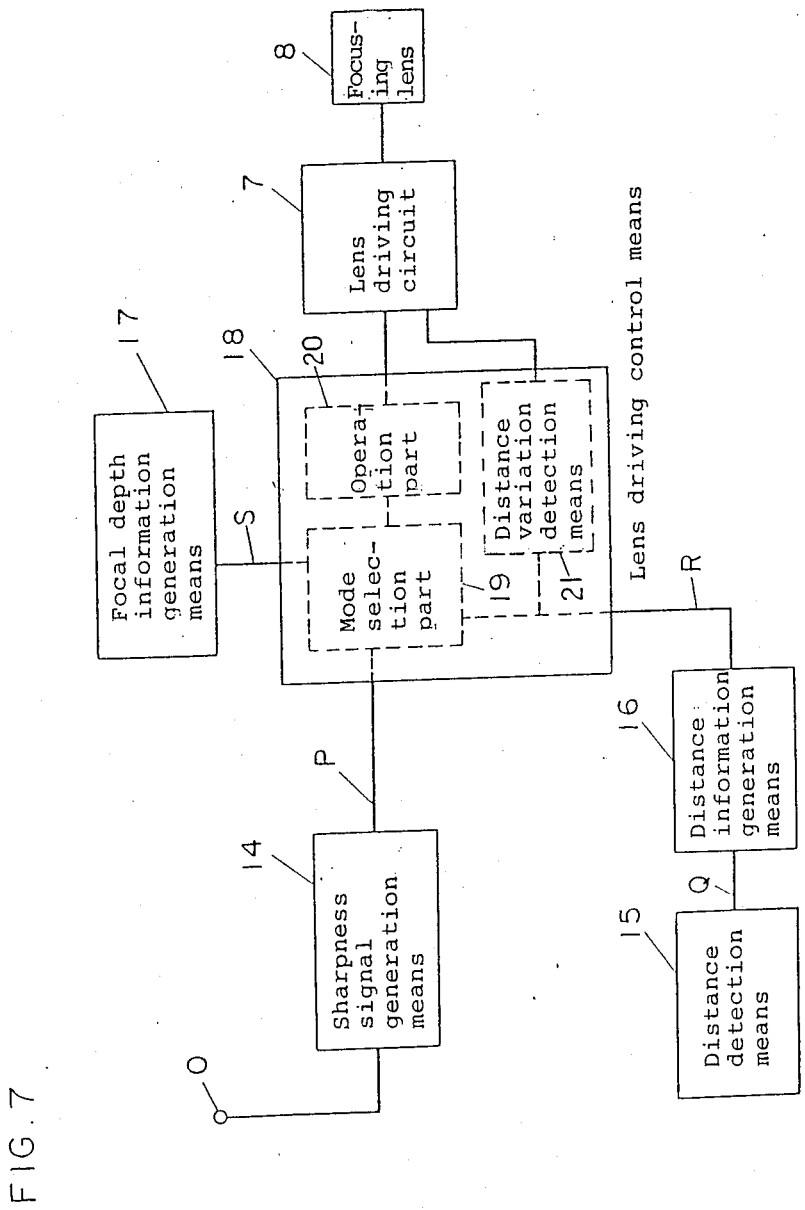
FIG. 7 is a block diagram showing still another embodiment of the automatic focusing apparatus in accordance with the present invention.

FIG. 7 is a block diagram showing still another embodiment of an automatic focusing apparatus in accordance with the present invention in which the received light signal level obtained by the infrared light projection-reception operation is formed as a distance signal, and the focal depth information is outputted. Variations of the distance signal start the lens movement, and the lens movement is terminated by the sharpness signal and the distance signal based on the focal depth information.

In FIG. 7, those parts designated with the same numerals as in FIG. 3 or FIG. 5 perform the same functions. In the drawing, 14 is a sharpness signal generation means which is comprised of the color signal elimination circuit 2, the differentiation circuit 3, the gate circuit 4, and the detection circuit 5. A video signal is supplied to a point O which is connected to the input terminal of means 14, and the sharpness-signal is outputted as a first distance information signal to output terminal P. Numeral 15 designates a distance detection means which is comprised of the light projection means 10 for projecting a specified amount of infrared light to an object, and the light reception means 11 receives the reflected light from the object as in FIG. 3 or FIG. 5. The received light signal level of the light reception means is outputted to a point Q. Numeral 16 designates a distance information generation means, which, by being supplied with the received light signal level output by the distance detection means 15, outputs the distance signal as a second distance information signal to its output terminal R. Numeral 17 designates a focal depth information generation means which issues the focal depth information corresponding to the focal depth of the focusing lens 8 to its output terminal S. Numeral 18 designates a lens driving control means, which includes a mode selection part 19 for selecting and setting an operation mode in which the focused state is judged from the first distance information signal at the point P, the second distance information at the point R, and the focal depth information at the point S, and an operation part 20 comprising a plural number of operation modes selected by mode selection part 19. A distance signal variation detection part 21 for detecting the variations of the second distance information signal at point R is also used for controlling the operation of the lens driving means 7 so as to move the focusing lens 8 based upon the outputs of the operation part 20 and the distance signal variation detection means 21. The output signal of the operation part 20 becomes the lens moving termination signal for stopping the movement of the lens 8, and the output of the distance signal variation detection part 21 becomes the lens movement start signal which starts the movement of the lens 8.

Referring to FIG. 8, the relation between the received light signal level obtained by the light projection-reception operation using a specified amount of infrared light and the distance between the object and the detection means 15 is shown. The characteristic shown is similar to that in FIG. 4, and the set of characteristic curves shown in FIG. 8 will be used for describing the above-mentioned relation more fully.

FIG. 8 shows the peak value characteristic of the received light signal level in a light reception means when a specified amount of infrared light is projected onto an arbitrary object as described above. The characteristic X represents the output of the detection means for a white wall which is considerably glossy; the characteristic Y corresponds to the characteristic shown in FIG. 4 in which a human is the object; and the characteristic Z shows the output for a deep black curtain. The abscissa indicates the distances to the object, and the ordinate indicates the relative levels on a logarithmic scale. Although those inclinations of respective characteristics have slight variations depending on the size of the objects or the spreading of the light projection, the tendencies for the above-mentioned three objects do not change; therefore, such variations can be neglected. Thus, in the following discussion, the characteristics shown in FIG. 8 will be used.

As is evident from FIG. 8, the peak value characteristics of the received light signal level, although there are differences between objects, may be explained as specified functions with respect to distance. This fact is evidence from the well-known characteristic that for the same object, even when a difference takes place in its contrast, the infrared reflectivity produces little variation. Thus, detailed description is not necessary.

The characteristic Y shows that the peak value of the light signal level at a distance of 3 m is found to be about 350, but when the distance is about 3.5 m, the peak value is only about 3/5 of this value. Thus, despite the small variation of 0.5 m in distance, a very large level variation can be detected. Accordingly, for the received light signal level in the infrared light projection-reception operation to be different from the sharpness signal, its variations with respect to distance should not be subjected to the influence caused by the variation in the contrast. This is additionally important because the light level and distance are related by an exponential function, and an extremely high sensitivity for the light level results.

The operation of the embodiment of the automatic focusing apparatus shown in FIG. 7, which is provided with the distance detection means 15, will now be described.

The movement start operation of the focus adjusting lens 8 first will be described. In the automatic focusing apparatus of the prior art using only the sharpness signal, since the sharpness signal follows the variations of the contrast, the video pictures become unsightly, as was noted above. In the present invention, however, the variations of the contrast are not followed, and only the variation of the distance is followed with a high sensitivity. Thus, the received light signal level which is the output signal of the distance detection means 15 of FIG. 7 responds to these distance variations with a very high sensitivity. These variations of the received light signal level are utilized as the moving start signal for the lens 8 by the lens driving means 7. The lens driving control means 18, which controls the operation of the lens driving control means 7, receives as an input the distance signal output by the distance information generation means 16. The distance signal variation detection means 21, which supplies the lens movement starting signal for starting the movement of the lens 8, detects variations of the distance signal. As a result of this detection, a lens movement starting characteristic of extremely high accuracy with respect to the distance variations can be attained.

As is also evident from FIG. 8, the received signal levels between a human object standing at a position of 3 m from the distance detection means 15 and a white wall at a position 4 m from the distance detecting means 15 are difficult to distinguish; therefore, when taking a picture by panning, lens movement cannot be started. Consequently, it is desirable that the judgment of the variations in the sharpness signals be determined by detecting two values at a maximum peak and a second maximum peak in a relatively long period such that when the difference between these two peak values varies more than a specified amount, the judgment is performed. This judgment would be performed during the infrared light projection-reception operation. This lens movement operation based on the sharpness signal variation may cause the response speed of the lens to be slightly slower; however, this scarcely happens if care is taken in determining the range of the light projection-reception operation. Therefore, there is no problem for such parallel installation.

Also, in this apparatus if during the initiation time the focusing lens is moved at the time that the power supply is started, by setting forcively an independent operation system that moves the lens to the state where the sharpness signal can be obtained, no particular problem is produced.

An explanation of the movement termination of the lens 8 including the judgment operation for the focused state will now be given.

The automatic focusing apparatus of the FIG. 7 embodiment is provided with a lens driving control means 18 to which the sharpness signal, the distance signal determined by the infrared light projection-reception operation, and the focal depth information signal are supplied, and the lens movement is terminated by the means 18 in a manner similar to that of the movement start operation described before. In other words, the lens driving control means 18 in this embodiment is operated in a manner such that in response to the supplied focal depth information, the distance information signal or the sharpness signal may be used for the judgment of the focused state, and the selected lens movement termination signal may be supplied to the lens driving means 7. Thus, in the mode selection part 19, an operation mode responding to the focal depth information is selected from a plural number of operation modes in the operation part 20 for the focused state judgment, and then the focused state judgment operation is performed in that operation mode to control the lens movement.

An example of an operation mode selected in this embodiment now will be described.

When the focal depth is shallow, a first operation mode which is the same as that of the prior art is selected, wherein only the sharpness signal is used, and the focused position of the lens is determined by detecting the peak value in the sharpness signals. In this manner, the lens movement is terminated. When the focal depth is relatively deep, on the other hand, a second operation mode is selected, wherein both the distance signal determined by the infrared light projection-reception operation and the sharpness signal are used for determining the required position of the lens, and at the same time, for distance values near this required position, the peak value detection operation for the sharpness signal is performed, thereby generating the lens movement termination signal. When the focal depth becomes even deeper, a third operation mode is selected, wherein the sharpness signal is not used due to its poor sensitivity with respect to the distance variations, and the focused state is judged only from the distance signal. Thus, the lens movement termination signal is generated at a specified point based upon the distance signal.

Each operation mode described above is selected in response to the focal depth information such that the lens movement termination signal is outputted so as to reduce the amount of variation of the sharpness signal with respect to the distance variations when the focal depth is deepened. As noted above, in such a case an accurate detection operation of the peak value cannot be performed; therefore, an accurate positioning of the lens in the focused position becomes impossible. The difficulty noted above which occurs in system using infrared or supersonic signals for measuring remote distances can be improved remarkably by the present invention as described below. Thus, the basic concept of setting the respective operation modes described above is that the sharpness signal influences the focused state judgment less as the focal depth becomes deep. In the present invention, on the other hand, since the distance signal determined by the projection-reception operation is provided as the distance information rather than the sharpness signal as the focal depth becomes deep, the distance information influences the focused state judgment more as the distance becomes greater. Accordingly, even though the focused state is judged from the sharpness signal, when the condition becomes such that the focal depth might produce the focusing difficulty noted above in the prior art, the sharpness signal which caused the difficulty is used only in an auxiliary action to the focused state judgment. In this manner, difficulties of the prior art are eliminated.

When a shallow focal depth is used which requires accurate distance information for objects at a relatively remote distance, the focused state is judged by the sharpness signal. Thus, the difficulty in the prior art methods using the infrared or the supersonic signals that accurate distance information cannot be obtained for objects at remote distances is also overcome in this embodiment.

Although three modes were selected in the preceding example, the number of selectable modes can be increased as desired. Reasons for setting of respective modes mentioned above now will be considered.

Zoom lenses used for those apparatuses having $\frac{2}{3}$ inch image sensing tubes have focal lengths on the order of 15 to 80 mm. In such lenses, if the aperture is kept at a constant value of 1.4 and a focal length of 20 mm is selected, the focal depth is relatively deep. Thus, if the focused position is set to 6 m, image pictures at 4 m to 10 m may be judged to be in the focused state. Also, if the focused position of the lens is set to 3 m, images in a range of about 2.5 m to 4 m may be judged to be in focus. Furthermore, if the focused position is set to 2 m, images in a range of about 1.7 m to 2.5 m may be regarded to be in the focused state. Consequently, if the focal length is taken to be 20 mm and if the peak values in the received light signal level in FIG. 8 are less than about 200, by setting the distance information based on the characteristic Y, even if the object is one having the characteristic X or Z, it corresponds to the focused distance to within a range which can be regarded as the focused state. Thus, it is not necessary to use the sharpness signal for the judgment of the focused state.

When a peak value of above 15 is obtained in FIG. 8, if the focused state of the lens is set based upon the characteristic Y, the distance must be around 6 m, and those objects from 4 m to 10 m are regarded to be in the focused state. By checking the corresponding distances of the characteristics Z and X at which the output of a peak value of about 15 is received, it is observed that distances of about 4.5 m and 7.5 m correspond to this light level, respectively. Since both are in the range of about 4 m to 10 m wherein the focused state is obtained, the setting of the focused position by the infrared light projection-reception operation based upon the characteristic Y presents no difficulty. Furthermore, if the peak value output of the Y characteristics at 4.5 m is checked, it is observed that the level is still sufficiently less than about 200.

If the peak value output exceeds about 200 for the characteristic Y, the above-mentioned relation does not hold, for those objects of the characteristic X or Z at the corresponding distances are not in the focused state. The difference in the focused points for this case is slight; therefore, if the focused state judgment operation is performed based upon an adequate maximum value detection means which detects the peak value of the sharpness signal only at the vacinity of the set value based on the characteristic Y, the focused point can be obtained very simply. In comparison with the method of performing the focused state judgment with only the sharpness signal, the accuracy becomes much better. Accordingly, when the focal length is set to 20 mm as described above, this setting of 20 mm is supplied as the focal depth information to the mode selection part 19 of the lens driving control means 18, and then the operation mode of the operation part 20 selects the state at which the second operation mode explained above is operated. The focused state judgment is thus performed in a very practical manner in accordance with the embodiment shown in FIG. 7.

If the focal length is set to 15 mm, the focal depth becomes even deeper. Thus, even when the peak value output exceeds about 200, the setting of the focused position based on the characteristic Y for those objects with the characteristic X or Z are also regarded to be in the focused state. In such a case it is not necessary to use the sharpness signal for the focused state judgment; therefore, the third operation mode described above is selected. Moreover, when the focal length is set to more than 30 mm causing the focal depth to become shallow, although the peak value output is not less than about 200, as is evident from FIG. 1, the focused state judgment can be determined from only the sharpness signal with the use of an adequate maximum value detection means. Furthermore, if the first operation mode described above is selected, the automatic focusing apparatus can sufficiently overcome those difficulties of the conventional apparatuses.

Although the selection of the respective operation modes is to be determined depending on the focal depth, it was recognized in an experiment done by the present inventors that no precise determination of focal depth is necessary. In other words, since the selection of the operation modes are the difficulty caused when the focal depth is deep, thereby causing the focused state to be obtained over a wide range, error of a certain degree in determining the focused position does not become a great problem. Thus, only when the focal depth becomes very deep, and it is to be determined whether the second or the third mode are to be selected is the effect of the focal depth of concern.

By way of example, if the above-mentioned focal depth information is formed only by the focal length of the lens disregarding the aperture value, and if the selection of respective operation modes is made by this difference in the lenses, an apparatus having an excellent focused state judgment characteristic in comparison with other apparatuses of the prior art is obtained. For example, in the embodiment described above, an excellent automatic focusing apparatus is obtained by constituting the mode selection part 19 of the lens driving control means 18 in a manner such that for focal lengths less than 20 mm, the third operation mode is selected, for focal lengths of 20 to 30 mm, the second operation mode is selected, and for focal lengths of 31 to 80 mm, the first operation mode is selected, respectively. This mode selection condition may be set in advance for the purpose of more accuracy by making an arbitrary program in which in addition to the focal lengths the effect of aperture values is also considered and such that the number of selectable operation modes is also adjustable. In this manner, the operating conditions can be set in accordance with their necessity.

The basic operation of the embodiment shown in FIG. 7 has been described, and as in the FIG. 5 embodiment the lens driving control means 18 of FIG. 7 can be constituted by a micro-computer. In addition, since the distance signal rather than the sharpness signal is used in the present embodiment as a detection signal by which the distance variation to the object is detected and as a distance information signal for deep focal depths, even if such a signal does not precisely correspond to the distance to the object as in the case wherein the focused state is judged only from the light projection-reception operation, the distance signal obtained from the received light signal level in the light projection-reception operation of a specified amount of infrared light as shown in the previous embodiments can be used. As a result, it is not necessary that the distance signal generation part in the present invention be made in a complex and accurate configuration of high cost as in the triangulation measurement system, for it can be made in a simple configuration of small-size and low cost.

As described above, the embodiment shown in FIG. 7 is provided with means for producing a distance signal from the light signal level received in the light projection-reception operation of a specified amount of infrared light, a sharpness signal, and focusing distance information, and it is also provided with a lens driving control means which starts the lens movement when variations in the distance signal are detected. The lens movement is stopped by using the sharpness signal and the distance signal based on the focal depth information. Thus, an automatic focusing apparatus in accordance with the present invention is extremely effective in video cameras or other cameras to which a zoom lens responding to the movement of an object may be attached in a simple configuration at a low cost.

As has been described above, in the automatic focusing apparatus of the present invention, the focused state judgment of a focusing lens in a video camera or other camera is performed by the peak point detection of the sharpness signal obtained from high-frequency components contained in the video signals, and at the same time, the start of the lens movement associated with the distance variations caused by the movement of objects is controlled by variation of received light signal levels of infrared light. In this manner, a lens movement which is caused by a mere contrast variation is eliminated, and a stable video picture is obtained. One of several focused state judgments based upon two distance information signals, the sharpness signal, and the infrared received light level are given priority depending on the focal depth of the lens being used, and the most suitable focusing operation mode for the lens being used is selected, thereby causing a stable focus control operation to be performed.

We claim:

1. An automatic focusing apparatus with a lens movement termination means, comprising:
    a sharpness signal generation means which detects a sharpness signal from high-frequency components of a brightness signal contained in a video signal corresponding to an object;

a maximum value detection means which generates a lens movement termination signal which stops movement of a focusing lens when said sharpness signal has a peak value;

a distance variation detection means comprising a light projection means which projects a specified amount of infrared light onto said object, a light reception means which receives reflected lights caused by projection of said specified amount of infrared light onto said object, and a received light signal level variation detection means which detects variations of the light level of said reflected infrared light for issuing a lens movement start signal; and a lens driving means including a driving source for controlling the movement of a lens in response to said lens movement termination signal and said lens movement start signal.

2. An automatic focusing apparatus as claimed in claim 1, wherein said sharpness signal generation means comprises:

a color signal elimination circuit which takes out only said brightness signal from said video signal;

a differential circuit which takes out high-frequency components from said brightness signal;

a gate circuit which selects high-frequency components included within a specified region of the picture frame; and a detection circuit which forms sharpness signals from said high-frequency components obtained through said gate circuit.

3. An automatic focusing apparatus as claimed in claim 1, wherein said maximum value detection means and said received light signal level variation detection means of said distance variation detection means are constituted by a microcomputer which:

(1) measures and memorizes first, second, and third signals corresponding to said sharpness signal, said reflected infrared light signal level, and positions of said lens, respectively;

(2) compares a measured value of said second signal at a preceding time with a measured value of said second signal at the present time, and when there is a difference, starting the lens movement toward a specified direction by issuing a lens movement start signal;

(3) compares a measured value of said first signal at a preceding time with a measured value of said first signal at the present time, and when the presence of an increase of the level of said first signal is detected, outputting a fourth signal;

(4) detects the presence of said fourth signal; and (5) when the presence of said fourth signal is confirmed, issues a lens movement termination signal.

4. An automatic focusing apparatus, comprising:

sharpness signal generation means for generating sharpness signals from high-frequency components of a brightness signal contained in a video signal as a first distance information signal;

distance detection means for performing a light projection-reception operation of a specific amount of infrared light onto said object and for outputting a received reflected infrared light signal;

distance information generation means for detecting a level of said received relected infrared light signal and generating a second distance information signal;

focal depth information generation means for generating focal depth information corresponding to a focal depth of a lens;

a lens driving circuit including a driving source which moves said lens; and lens driving control means supplied with said first and second distance information signals and said focal depth information for outputting a movement start signal for said lens by detecting variations in said second distance information and selecting based upon said focal depth information a first operation state wherein the focusing state is determined from said first distance information or a second operation state wherein the focusing state is determined from said second distance information, wherein said lens driving control means outputs a movement termination signal to said lens for respectively selected operation states and said movement start signal and said movement termination signal are supplied to said lens driving circuit so as to bring said lens into focus.

5. An automatic focusing apparatus as claimed in claim 4, wherein said lens driving control means includes:

a distance variation detection circuit which outputs said movement start signal to said lens when variation of said second distance information is detected;

an operation part having a plural number of operation mode including said first and second operation states; and a mode selection part which selects said operation modes in reponse to said focal depth information, wherein said first operation state is selected when said focal depth is shallow, and said second operation state is selected when said focal depth is deep, respectively.

6. An automatic focusing apparatus as claimed in claim 4, wherein said first operation state is set by a selection of the first operation mode which outputs the movement termination signal to said lens when a peak value of the sharpness signal is detected.

7. An automatic focusing apparatus as claimed in claim 4, wherein said second operation state is set by a selection of the second operation mode which sets the focused state based upon a distance signal generated before and a distance signal generated after the focused state, said focusing lens stopping at a sharpness signal peak value output point between said before and after positions, wherein a third operation mode is selected to stop the focusing lens at the focused state based upon said before and after distance signals.

8. An automatic focusing apparatus, comprising:

sharpness signal generation means for generating a sharpness signal from high-frequency components of a brightness signal contained in a video signal corresponding to an object;

distance detection means for performing a light projection/reception opeation of a specific amount of infrared light onto said object and for outputting a received reflected infrared light signal;

lens driving control means supplied with said sharpness signal and said received reflected infrared light signal for detecting variations of the light level of said received reflected infrared light signal and outputting a lens movement start signal which starts movement of said focusing lens when said variations are detected, said lens driving control neans also outputting a lens movement termination signal which stops movement of said focusing lens when said sharpness signal has a peak value indicating that said lens is in focus; and lens driving means for controlling the movement of a lens in response to said lens movement start signal and said lens movement termination signal.

9. An automatic lens focusing apparatus, comprising:

means responsive to a video signal corresponding to an object for generating a sharpness signal;

driving means for moving a focusing lens;

means responsive to variations in object distances for starting operation of said driving means; and means responsive to said sharpness signal for generating a termination signal at a maximum value of said sharpness signal for terminating operation of said driving means 10. An automatic focusing apparatus as claimed in claim 9, wherein said termination signal generating means comprises maximum value detection means for detecting maximum values in said sharpness signals and outputting said termination signal when said maximum values are detected.

11. An automatic focusing apparatus as claimed in claim 9, wherein said means for starting said driving means and said termination signal generating means comprise a microcomputer which:

(1) measures and memorizes first, second and third signals corresponding to said sharpness signal, an object distance variation signal, and positions of said focusing lens, respectively;

(2) compares a measured value of said second signal at a preceding time with a measured value of said second signal at the present time, and when there is a difference, starting lens movement by issuing a lens movement start signal;

(3) compares a measured value of said first signal at a preceding time with a measured value of said first signal at the present time, and when an increase of the level of said first signal is detected, outputting a fourth signal;

(4) detects the presence of said fourth signal; and (5) when said fourth signal is detected, issues a lens movement termination signal.

12. An automatic focusing apparatus as claimed in claim 9, further comprising:

focal depth information generating means for generating focal depth information corresponding to a focal depth of said focusing lens, said focal depth information being inputting to said termination signal generating means.

13. An automatic focusing apparatus as claimed in claim 12, wherein said termination signal generating means is responsive to said focal depth information, said sharpness signal and an object distance variation signal outputted by said driving means starting means for selecting based upon said focal depth information a first operation mode wherein said termination signal is determined responsive to said sharpness signal and a second operation mode wherein said termination signal is determined responsive to said object distance variation signal.

14. An automatic focusing apparatus as claimed in claim 13, wherein said first operation mode is selected when said focal depth is shallow and said second operation mode is selected when said focal depth is deep, respectively.

15. An automatic focusing apparatus as claimed in claim 13, wherein said second operation mode is selected based upon a distance signal generated before and a distance signal generated after a focused state, said focusing lens stopping at a peak value of said sharpness signal occurring between said before and after positions, wherein a third operation mode is selected to stop the focusing lens at the focused state based upon said before and after distance signals.

* * * * *